US012750449B2

(12) United States Patent
Ichimi

(10) Patent No.: US 12,750,449 B2
(45) Date of Patent: Sep. 29, 2026

(54) INSPECTION SYSTEM AND CONTROL METHOD

(71) Applicant: CANON KABUSHIKI KAISHA, Tokyo (JP)

(72) Inventor: Hideshi Ichimi, Ibaraki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/451,006

(22) Filed: Aug. 16, 2023

(65) Prior Publication Data

US 2024/0073324 A1 Feb. 29, 2024

(30) Foreign Application Priority Data

Aug. 26, 2022 (JP) ................................. 2022-134631

(51) Int. Cl.
*H04N 1/00* (2006.01)
*G06T 7/00* (2017.01)

(52) U.S. Cl.
CPC ......... *H04N 1/00045* (2013.01); *G06T 7/001* (2013.01); *H04N 1/00015* (2013.01); *H04N 1/00029* (2013.01); *H04N 1/00039* (2013.01); *G06T 2207/30144* (2013.01)

(58) Field of Classification Search
None
See application file for complete search history.

(56) References Cited

U.S. PATENT DOCUMENTS

| | | | | |
|---|---|---|---|---|
| 10,788,777 | B2 * | 9/2020 | Ikuta | G03G 15/5041 |
| 2011/0129239 | A1 * | 6/2011 | Kubota | G03G 15/655 399/16 |
| 2020/0356318 | A1 * | 11/2020 | Wei | G06F 3/1234 |
| 2021/0390676 | A1 * | 12/2021 | Floeder | G06T 3/02 |
| 2022/0106149 | A1 * | 4/2022 | Komazawa | G03G 15/6508 |
| 2022/0222499 | A1 * | 7/2022 | Wakai | G06K 15/403 |
| 2023/0308548 | A1 * | 9/2023 | Azuma | G06F 3/121 |

FOREIGN PATENT DOCUMENTS

| | | | |
|---|---|---|---|
| JP | 2019217724 | A | 12/2019 |
| JP | 2020116746 | A | 8/2020 |

* cited by examiner

*Primary Examiner* — Benjamin O Dulaney
(74) *Attorney, Agent, or Firm* — Canon U.S.A., Inc. IP Division

(57) ABSTRACT

An example of a user interface that enables setting an inspection region in a sheet having a different shape from a sheet set for a correct image will be described below. Inspection processing is performed on an image output to the sheet having the different shape from the sheet set for the correct image, based on the inspection region set in advanced settings, the correct image, and an image obtained as a result of reading by a camera.

10 Claims, 12 Drawing Sheets

CORRECT IMAGE SCANNED IMAGE

1001

COMPARATIVE EXAMPLE WITH ADVANCED SETTING

1002

COMPARATIVE EXAMPLE WITH AUTOMATIC SETTING

1003

COMPARATIVE EXAMPLE WITHOUT SETTING

EXAMPLE OF PRINTING ON TAB PORTION

EXAMPLE OF INSPECTION ON TAB PORTION

INSPECTION SYSTEM AND CONTROL METHOD

BACKGROUND

Field of the Disclosure

The present disclosure relates to a method for controlling a printing system including a print product inspection apparatus, and to a program.

Description of the Related Art

A printing system capable of inspecting a sheet printed by a printing apparatus, by using an inspection apparatus during sheet conveyance, is currently under development. In print sheet inspection, the inspection apparatus reads an image on a conveyed print sheet, and determines whether the print sheet is normal by subjecting the read image to image analysis. In the inspection, the inspection apparatus compares read image data with correct image data registered in the inspection apparatus to determine a result of the inspection. In performing the inspection, a user preregisters correct images to be used for the inspection in the inspection apparatus. In inputting an inspection job to the printing apparatus, the user selects the correct image corresponding to the inspection job to be input, from among the correct images preregistered in the inspection apparatus. Through the above-described inspection, the inspection apparatus is able to detect, for example, missing portions of bar codes and ruled lines, missing images, print failures, missing pages, and color shifts.

Japanese Patent Application Laid-Open No. 2020-116746 considers the exclusion of a predetermined print sheet, such as an embossed sheet, from an inspection target sheet because such a sheet will lead to an unacceptable inspection result.

However, Japanese Patent Application Laid-Open No. 2020-116746 refers to the exclusion of embossed sheets from inspection target sheets but does not refer to tab sheets (tab dividers). Japanese Patent Application Laid-Open No. 2020-116746 does not respond to a demand for inspecting a result of printing on print media having irregular shapes.

SUMMARY

The present disclosure has been embodied in view of the above-described issues. An aspect of the present disclosure is directed to providing a mechanism for inspecting a print medium having a different shape from a print medium set for an inspection target image.

Another aspect of the present disclosure is directed to providing a mechanism with which an inspection reflecting user demands is feasible.

According to an aspect of the present disclosure, an inspection system includes a setting unit configured to set an inspection region in a sheet having a different shape from a sheet set for a correct image, a reading unit configured to read the sheet having the different shape from the sheet set for the correct image, and an execution unit configured to execute inspection processing on an image output to the sheet having the different shape from the sheet set for the correct image, based on the inspection region set by the setting unit, the correct image, and an image obtained as a result of reading by the reading unit.

Further features of the present disclosure will become apparent from the following description of exemplary embodiments with reference to the attached drawings.

DESCRIPTION OF THE EMBODIMENTS

Examples of exemplary embodiments for embodying the present disclosure will be described below with reference to the accompanying drawings.

In the following descriptions, an external controller may also be referred to as an image processing controller, digital front end (DFE), or print server. An image forming apparatus may also be referred to as a multifunction peripheral (MFP).

Figure 1:
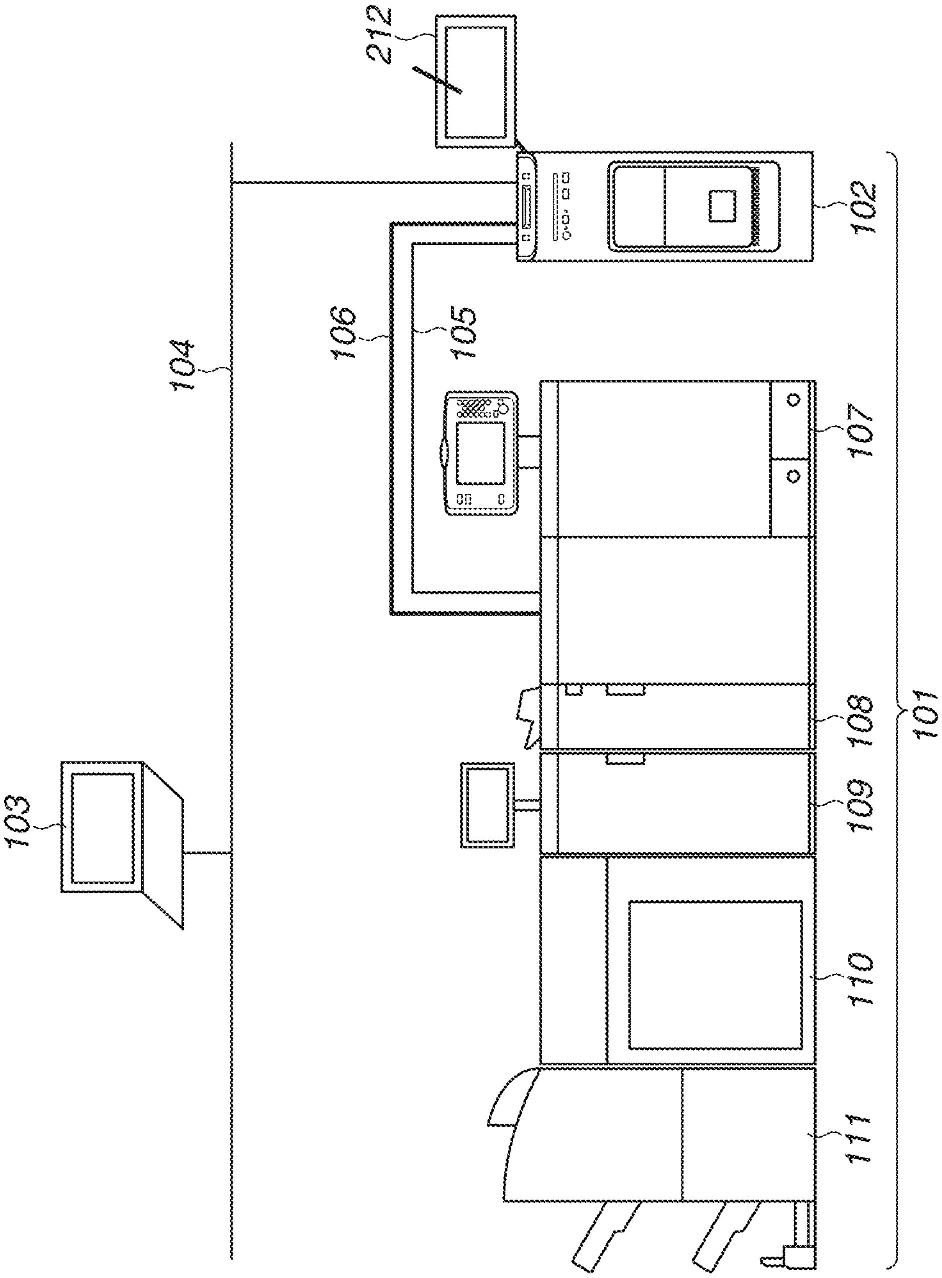
FIG. 1 illustrates an example hardware configuration of a printing system.

A first exemplary embodiment will be described below. FIG. 1 illustrates an example hardware configuration of an image processing system according to the first exemplary embodiment. The image processing system includes an image forming apparatus 101 and an external controller 102. The image forming apparatus 101 and the external controller 102 are communicably connected to each other via an internal local area network (LAN) 105 and a video cable 106. The external controller 102 is communicably connected to a client personal computer (PC) 103 via an external LAN 104. The client PC 103 issues a print instruction to the external controller 102.

A printer driver having a function of converting print data into a printing description language processable by the external controller 102 is installed on the client PC 103. A user who wants to perform printing can issue a print instruction from various applications via the printer driver. The printer driver transmits print data to the external controller 102 based on the print instruction from the user. In response to receiving the print instruction from the PC 103, the external controller 102 subjects the print data to data analysis and rasterization processing and then inputs the print data to the image forming apparatus 101 to issue a print instruction.

The external controller 102 has two different functions: a function of registering a correct image and a function of performing inspection.

Initially, the external controller 102 receives print data from the client PC 103. The external controller 102 then generates a correct image based on the print data. When registration of a correct image is instructed, the external controller 102 transmits the correct image to an inspection apparatus 109 via the internal LAN 105. In response to receiving the correct image, the inspection apparatus 109 registers the image in the inspection apparatus 109. Printing execution will be described below. Initially, the external controller 102 receives print data from the client PC 103. The external controller 102 generates a print image to be subjected to inspection based on the print data. The print image is transmitted to the printing apparatus 107. The printing apparatus 107 performs printing on a sheet based on the print image. The printed sheet is conveyed to the inspection apparatus 109. An imaging unit 240 captures an image of the printed sheet to generate an inspection target image. The sheet is then conveyed to a large-capacity stacker 110 and discharged, subsequently. The inspection apparatus 109 compares the inspection target image with the registered correct image to subject the print result output on a sheet to inspection processing.

The image forming apparatus 101 will be described below. The image forming apparatus 101 is connected to a plurality of apparatuses having different functions. The image forming apparatus 101 is configured to perform complicated print processing including bookbinding.

The printing apparatus 107 forms an image by using a toner on a sheet conveyed from a sheet feeding unit at a lower part of the printing apparatus 107. The configuration and operating principle of the printing apparatus 107 will be described below. The printing apparatus 107 irradiates a photosensitive drum with scanning light as a laser beam modulated with image data, reflected by a rotating polygon mirror and the like. An electrostatic latent image formed on the photosensitive drum by the laser beam is developed by the toner. The generated toner image is transferred onto a sheet stuck on a transfer drum. The printing apparatus 107 performs this image forming process for yellow (Y), magenta (M), cyan (C), and black (K) toners in this order to form a full color image on the sheet. The sheet with the full color image formed thereon on the transfer drum is conveyed to a fixing unit. The fixing unit includes a roller and a belt, and the roller includes a heat source such as a halogen heater. The fixing unit melts the toner on the sheet with a toner image transferred thereon, with heat and pressure, to fix the toner image to the sheet.

An inserter 108 is used to insert an insertion sheet. The inserter 108 enables inserting a sheet at a desired position for a group of sheets printed by and conveyed from the printing apparatus 107.

The inspection apparatus 109 reads the image of the conveyed sheet and compares the image with a preregistered correct image to determine whether the printed image is normal.

The large-capacity stacker 110 is capable of stacking a large number of sheets. A finisher 111 applies finishing processing to conveyed sheets. The finisher 111 performs finishing, such as stapling, punching, and saddle stitching binding, and discharges processed sheets to a discharge tray.

While the external controller 102 is connected to the image forming apparatus 101 in the printing system illustrated in FIG. 1, the present disclosure is not limited to the configuration with the external controller 102 connected the image forming apparatus 101.

More specifically, the image forming apparatus 101 may be connected to the external LAN 104, and the client PC 103 may transmit print data processable by the image forming apparatus 101. In such a case, the image forming apparatus 101 performs data analysis and/or rasterization processing before print processing.

Figure 2:
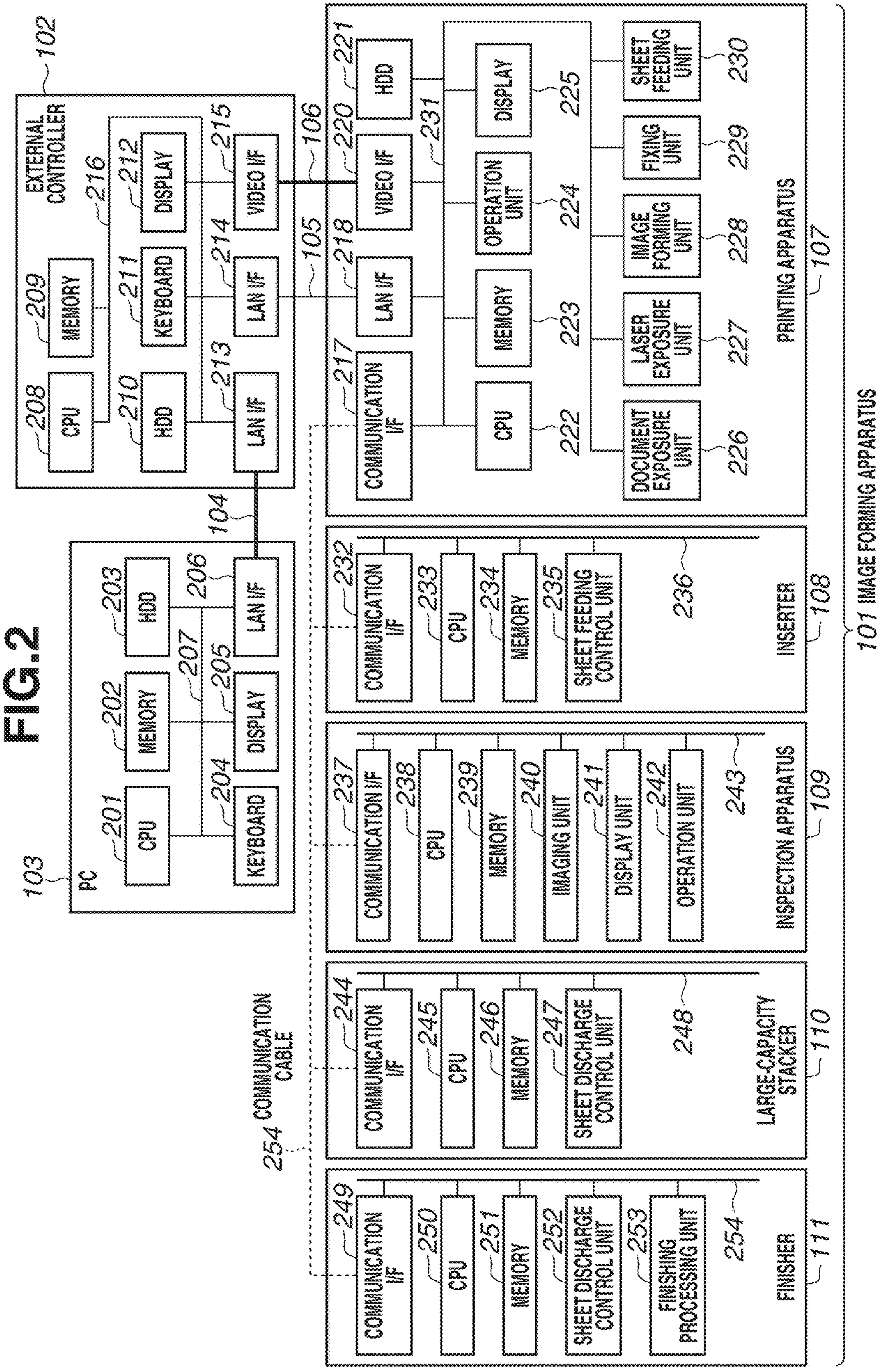
FIG. 2 is an example block diagram illustrating a system configuration of the printing system.

FIG. 2 is a block diagram illustrating a system configuration including the image forming apparatus 101, the external controller 102, and the client PC 103.

The configuration of the printing apparatus 107 of the image forming apparatus 101 will be described below. The printing apparatus 107 of the image forming apparatus 101 includes a communication interface (I/F) 217, a LAN I/F 218, a video I/F 220, a hard disk drive (HDD) 221, a central processing unit (CPU) 222, a memory 223, an operation unit 224, and a display 225. The printing apparatus 107 of the image forming apparatus 101 further includes a document exposure unit 226, a laser exposure unit 227, an image forming unit 228, a fixing unit 229, and a sheet feeding unit 230. These components are connected to each other via a system bus 231.

The communication I/F 217 is connected to the inserter 108, the inspection apparatus 109, the large-capacity stacker 110, and the finisher 111 via a system bus 254, and performs communication for controlling each apparatus.

The LAN I/F 218 is connected to the external controller 102 via the internal LAN 105 to communicate print data.

The video I/F 220 is connected to the external controller 102 via the video cable 106 to communicate image data.

The HDD 221 is a storage device for storing programs and data. The CPU 222 controls image processing and printing based on programs stored in the HDD 221. The memory 223 stores programs and image data to be used for the CPU 222 to perform various processing, and operates as a work area. The operation unit 224 receives various setting inputs and operation instructions from the user. The display 225 displays setting information for image forming apparatus 101 and a print job processing status of image forming apparatus 101. The document exposure unit 226 performs processing of reading a document when the copy or scanning function is used. The document exposure unit 226 reads document data by capturing an image of the document by using a charge coupled device (CCD) camera while irradiating a sheet placed by a user with light of an exposure lamp. The laser exposure unit 227 performs primary charge to irradiate the photosensitive drum with a laser beam and then performs laser exposure to transfer a toner image. The laser exposure unit 227 initially performs primary charge to charge the surface of the photosensitive drum to a uniform negative potential. The laser exposure unit 227 then irradiates the photosensitive drum with a laser beam by a laser driver while controlling the reflection angle by using the polygon mirror. Thus, negative charges on the irradiated portions are neutralized, and an electrostatic latent image is formed. The image forming unit 228, which serves as a device for transferring toner onto a sheet, includes a developing unit, a transfer unit, and a toner supply unit, and transfers toner on the photosensitive drum onto a sheet. The developing unit causes a negatively charged toner from a developing cylinder to stick to the electrostatic latent image on the surface of the photosensitive drum to visualize the image. The transfer unit performs primary transfer to apply a positive potential to a primary transfer roller to transfer the toner on the surface of the photosensitive drum to a transfer belt, and then performs secondary transfer to apply a positive potential to a secondary transfer roller to transfer the toner on the transfer belt to the sheet. The fixing unit 229 melts and fixes the toner on the paper with heat and pressure. The unit 229 includes a heater, a fixing belt, and a pressurization belt. The sheet feeding unit 230 supplies sheet and controls the sheet feed and conveyance operations by using rollers and various sensors.

The configuration of the inserter 108 of the image forming apparatus 101 will be described below. The inserter 108 of the image forming apparatus 101 includes a communication I/F 232, a CPU 233, a memory 234, and a sheet feeding control unit 235 which are connected to each other via a system bus 236. The communication I/F 232 is connected to the printing apparatus 107 via the system bus 254 and performs communication to be used for control. The CPU 233 performs various control to be used for sheet feeding in accordance with a control program stored in the memory 234. The memory 234 is a storage device storing the control program. The sheet feeding control unit 235 controls feeding and conveyance of the sheet conveyed from the sheet feeding portion of the inserter 108 and the printing apparatus 107 while controlling the rollers and sensors based on instructions from the CPU 218.

The configuration of the inspection apparatus 109 of the image forming apparatus 101 will be described below. The inspection apparatus 109 of the image forming apparatus 101 includes a communication I/F 237, a CPU 238, a memory 239, an imaging unit 240, a display unit 241, and an operation unit 242 which are connected to each other via a system bus 243. The communication I/F 237 is connected to the printing apparatus 107 via the system bus 254 to perform communication to be used for control. The CPU 238 performs various control to be used for inspection in accordance with a control program stored in the memory 239. The memory 239 is a storage device storing the control program. The imaging unit 240 captures the conveyed sheet based on instructions of the CPU 238. The CPU 238 compares the image captured by the imaging unit 240 with the correct image stored in the memory 239 to determine whether the printed image is normal. The display unit 241 displays inspection results and setting screens. The operation unit 242 is operated by the user to receive instruction(s) to change the settings of the inspection apparatus 109 and/or register a correct image.

The configuration of the large-capacity stacker 110 of the image forming apparatus 101 will be described below. The large-capacity stacker 110 of the image forming apparatus 101 includes a communication I/F 244, a CPU 245, a memory 246, and a sheet discharge control unit 247 which are connected via a system bus 248. The communication I/F 244 is connected to the printing apparatus 107 via the system bus 254 to perform communication to be used for control. The CPU 245 performs various control to be used for sheet discharge in accordance with a control program stored in the memory 246. The memory 239 is a storage device storing the control program. The sheet discharge control unit 247 performs control for conveying the conveyed sheet to a stack tray, an escape tray, or the following finisher 111 based on instructions from the CPU 245.

The configuration of the finisher 111 of the image forming apparatus 101 will be described below. The finisher 111 of the image forming apparatus 101 includes a communication I/F 249, a CPU 250, a memory 251, a sheet discharge control unit 252, and a finishing processing unit 253 which are connected via the system bus 254. The communication I/F 249 is connected to the printing apparatus 107 via the system bus 254 to perform communication to be used for control. The CPU 250 performs various control to be used for finishing and sheet discharge in accordance with a control program stored in the memory 251. The memory 251 is a storage device storing the control program. The sheet discharge control unit 252 controls the sheet conveyance and discharge based on instructions from the CPU 250. The finishing processing unit 253 controls finishing processing, such as stapling, punching, and saddle stitching binding, based on instructions from the CPU 250.

The configuration of the external controller 102 will be described below. The external controller 102 includes a CPU 208, a memory 209, an HDD 210, a keyboard 211, a display 212, LAN I/Fs 213 and 214, and a video I/F 215 which are connected via a system bus 216. The CPU 208 comprehensively performs processing for receiving print data from the client PC 103, raster image processing (RIP), processing for transmitting print data to the image forming apparatus 101, and other types of processing based on programs and data stored in the HDD 210. The memory 209 stores programs and data to be used by the CPU 208 to perform various processing, and operates as a work area. The HDD 210 stores programs and data to be used for print processing. The keyboard 211 inputs operation instructions of the external controller 102. The display 212 displays information about, for example, the application executed by the external controller 102, by using video signals of still and moving images. The LAN I/F 213 is connected to the client PC 103 via the external LAN 104 to communicate print instructions and other information.

The LAN I/F 214 is connected to the image forming apparatus 101 via the internal LAN 105 to communicate print instructions and other information. The video I/F 215 is connected to the image forming apparatus 101 via the video cable 106 to communicate print data.

The configuration of the client PC 103 will be described below. The client PC 103 includes a CPU 201, a memory 202, an HDD 203, a keyboard 204, a display 205, and a LAN I/F 206 which are connected to each other via a system bus 207. The CPU 201 generates print data and issues print instructions based on a document processing program and the like stored in the HDD 203. The CPU 201 also comprehensively controls each device connected to the system bus 207. The memory 202 stores programs and data to be used by the CPU 201 to perform various processing, and operates as a work area. The HDD 203 stores programs and data to be used for operations, such as print processing. The keyboard 204 inputs operation instructions for the PC 103. The display 205 displays information about, for example, the application executed by the client PC 103, by using video signals of still and moving images. The LAN I/F 206 is connected to the external LAN 104 to communicate print instructions.

While the external controller 102 and the image forming apparatus 101 are connected via the internal LAN 105 and the video cable 106 in the above descriptions, any configuration that enables data for printing to be transmitted and received may be employed. For example, a configuration in which the external controller 102 and the image forming apparatus 101 are connected only to the video cable 106 may be used. It is only required for the memories 202, 209, 223, 234, 239, 249, and 251 to serve as storage devices for storing data and programs. For example, these memories may be substituted by a volatile random access memory (RAM), nonvolatile read only memory (ROM), built-in HDD, external HDD, and universal serial bus (USB) memory.

Figure 3:
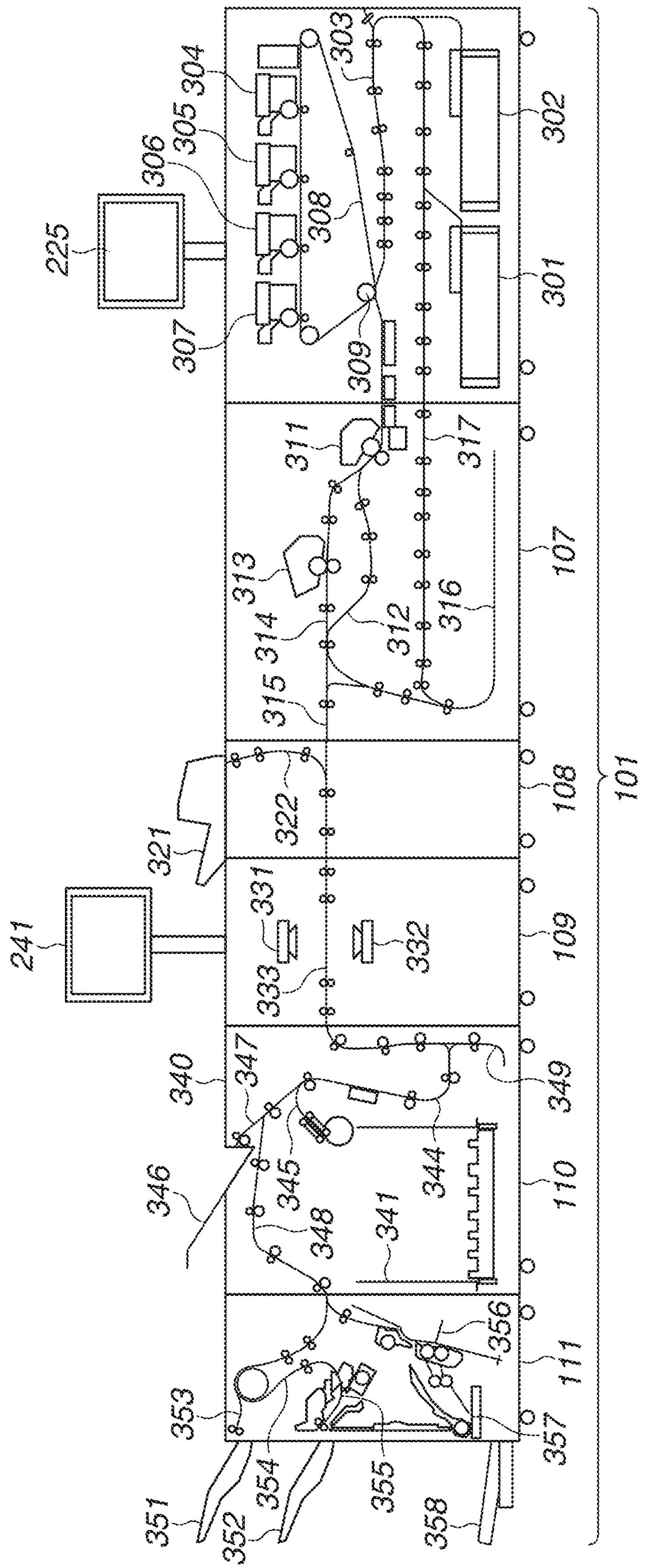
FIG. 3 is an example schematic sectional view illustrating a mechanism of an image forming apparatus.

FIG. 3 is a sectional view illustrating a mechanism of the image forming apparatus 101. The printing apparatus 107 forms an image to be printed, on a sheet. Sheet feed decks 301 and 302 can store various types of sheets. For each sheet feed deck, information (sheet size and sheet type) about the stored sheet is settable from the operation unit 224 of the printing apparatus 107. Each sheet feed deck is able to separate the topmost sheet from the stored sheets and conveys the sheet to a sheet conveyance path 303. Development stations 304, 305, 306, and 307 form toner images by using Y, M, C, and K color toners, respectively, to form a color image. The toner images thus formed are primarily transferred to an intermediate transfer belt 308 which rotates in the clockwise direction. The toner images are transferred to the sheet conveyed from the sheet conveyance path 303 at a secondary transfer position 309. The display 225 displays the printing status and setting information for the image forming apparatus 101. A fixing unit 311 fixes the toner images to a sheet. The fixing unit 311 includes a pressure roller and a heat roller. When a sheet passes between these rollers, the fixing unit 311 melts and pressurizes the toner to fix the toner images to the sheet. The sheet having exited the fixing unit 311 passes through a sheet conveyance path 312 and is conveyed to a portion 315. If the sheet is to be subjected to additional melting and pressurization for fixing, which depends on the sheet type, the sheet that has passed through the fixing unit 311 is conveyed to a second fixing unit 313 via the above-described sheet conveyance path. After having been subjected to additional melting and pressurization, the sheet passes through a sheet conveyance path 314 and then is conveyed to the portion 315. In the two-sided image forming mode, the sheet is conveyed to a sheet reversing path 316, reversed in the path 316, and then conveyed to a two-sided conveyance path 317. Then, image transfer is performed on the second surface at a secondary transfer position 309.

The inserter 108 is used to insert an insertion sheet. The inserter 108 includes an inserter tray 321 and causes the insertion sheet supplied from a sheet conveyance path 322 to join into the main conveyance path. This enables inserting a series of sheets conveyed from the printing apparatus 107 at a desired position, and conveying the sheet group to the follower apparatus.

The sheet that has passed the inserter 108 is conveyed to the inspection apparatus 109. The inspection apparatus 109 includes therein cameras 331 and 332 disposed to face each other. The camera 331 is used to read the upper surface of the sheet, and the camera 332 is used to read the under surface thereof. The inspection apparatus 109 reads the image on the sheet by using the cameras 331 and 332 at the timing when the sheet conveyed via a sheet conveyance path 333 reaches a predetermined position, and determines whether the image of the apparatus is normal. The display unit 241 displays a result of the inspection performed by the inspection apparatus 109.

The large-capacity stacker 110 can stack a large number of sheets. The large-capacity stacker 110 includes a stack tray 341 as a sheet stacking tray. The sheet that has passed the inspection apparatus 109 passes through a sheet conveyance path 344 and then is input to the large-capacity stacker 110. The sheet from the sheet conveyance path 344 passes through a sheet conveyance path 345 and then is stacked on the stack tray 341. The stacker 340 further includes an escape tray 346 as a sheet discharge tray. The escape tray 346 is a sheet discharge tray used to discharge a sheet determined to be a defective sheet by the inspection apparatus 109. When a sheet is to be discharged to the escape tray 346, the sheet from the sheet conveyance path 344 passes through a sheet conveyance path 347 and then is conveyed to the escape tray 346. When a sheet is to be conveyed to a post-processing apparatus in the following stage of the large-capacity stacker 110, the sheet is conveyed via a sheet conveyance path 348. A reversing unit 349 flips a sheet. The reversing unit 349 is used when a sheet is to be stacked on the stack tray 341. In a case where a sheet is to be stacked on the stack tray 341, the reversing unit 349 flips the sheet so that the orientation of the input sheet coincides with the orientation of the sheet when output. In a case where a sheet is to be conveyed to the escape tray 346 or the following post-processing apparatus, the reversing unit 349 does not perform the flipping operation so that the sheet is discharged as it is without being flipped.

The finisher 111 subjects finishing processing to the conveyed sheet in accordance with the function specified by the user. More specifically, the finisher 111 has a finishing function of, for example, stapling (one- or two-position binding), (two- or three-hole) punching, and saddle stitching binding. The finisher 111 includes two sheet discharge trays 351 and 352 and discharges a sheet to the sheet discharge tray 351 via a sheet conveyance path 353. Here, finishing processing of stapling and the like cannot be performed by using the sheet conveyance path 353. To perform finishing processing of stapling and the like, the finishing function specified by the user is performed at the processing unit 355 on the sheet conveyed via a sheet conveyance path 354, and then the sheet is output to the sheet discharge tray 352. The sheet discharge trays 351 and 352 is configured to be raised and lowered. For example, the sheet discharge tray 351 is lowered and is operated such that the sheet after the finishing processing by the processing unit 355 is stacked on the sheet discharge tray 351. In a case where saddle stitching binding is specified, a saddle stitching processing unit 356 performs stapling on the center of sheets, folds the sheets in two, and discharges the sheets to a saddle stitching binding tray 358 via a sheet conveyance path 357. The saddle stitching binding tray 358 includes a belt conveyor that leftwardly conveys the saddle-stitching-bound sheet bundle stacked on the saddle stitching binding tray 358.

Figure 4:
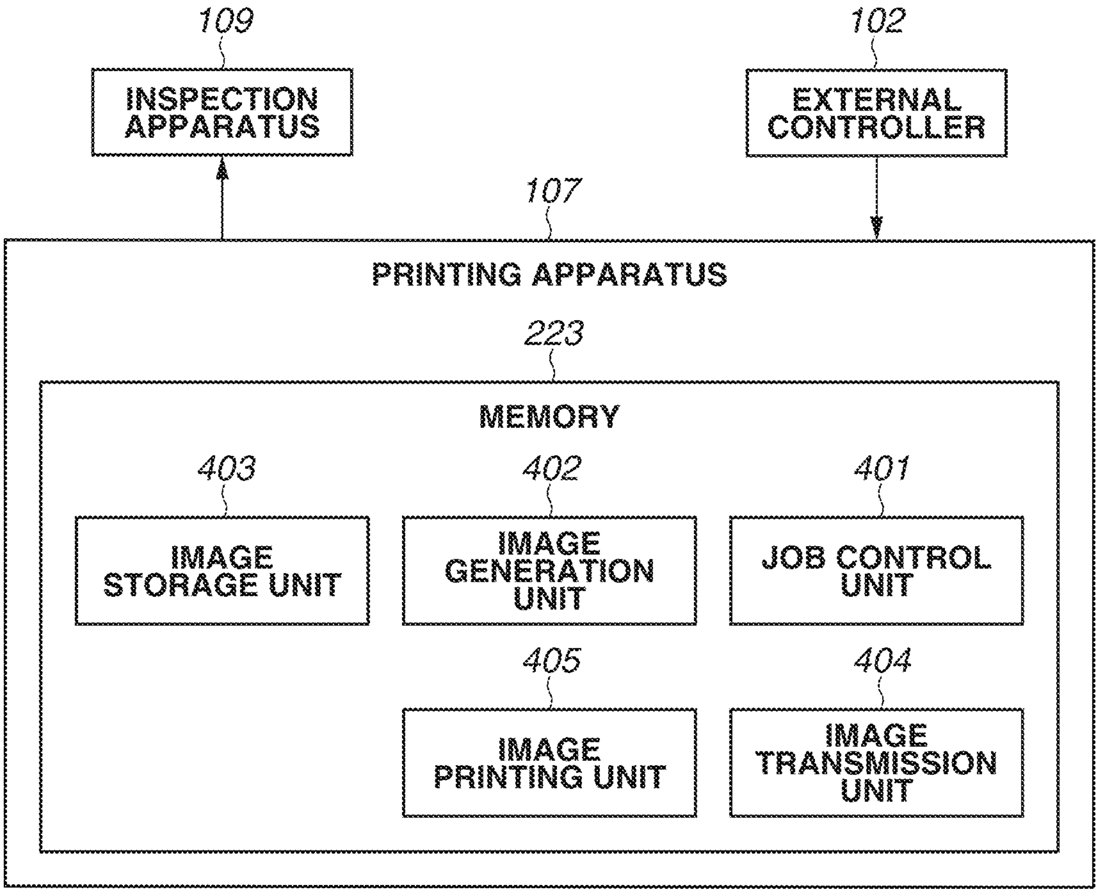
FIG. 4 illustrates examples of software and hardware configurations related to inspection of the printing system.

FIG. 4 illustrates example software and hardware configurations related to the inspection of the printing system. Programs and data stored in the HDD 221 are loaded into the memory 223 and then executed by the CPU 208. The memory 223 in FIG. 4 stores software modules that are executed by the CPU 208.

A job control unit 401 analyzes the type of the job transmitted from the external controller 102. The received job is supplied with information about the settings made for the job. The job control unit 401 analyzes the setting information, and requests the following suitable program to process the job by supplying the setting information thereto.

An image generation unit 402 converts a document in association with the job transmitted from the external controller 102 into image data. The image generation unit 402 performs image processing of generating an image in accordance with the job type, such as a print job and storage job, and job settings. The image generation unit 402 also generates a correct image to be registered to the inspection apparatus 109 (described below).

An image storage unit 403 performs processing for converting the document transmitted from the external controller 102 into an image and storing the image in the HDD 221.

While images are not stored for normal print jobs, images are temporarily stored in the HDD 221 in a case where an image prestored in the printing apparatus 107 is selected, with the operation unit 224 of the printing apparatus 107, and printed and/or a case where a correct image is registered in the inspection apparatus 109.

An image transmission unit 404 is a processing unit that exchanges data with the inspection apparatus 109, detects that a correct image for inspection has been temporarily stored in the HDD, and transmits the stored correct image to the inspection apparatus 109. In a case where the inspection processing is performed, the image transmission unit 404 instructs the inspection apparatus 109 to start the inspection. An image printing unit 405 performs printing of the printing apparatus 107 in accordance with a job transmitted from the external controller 102.

Figure 5:
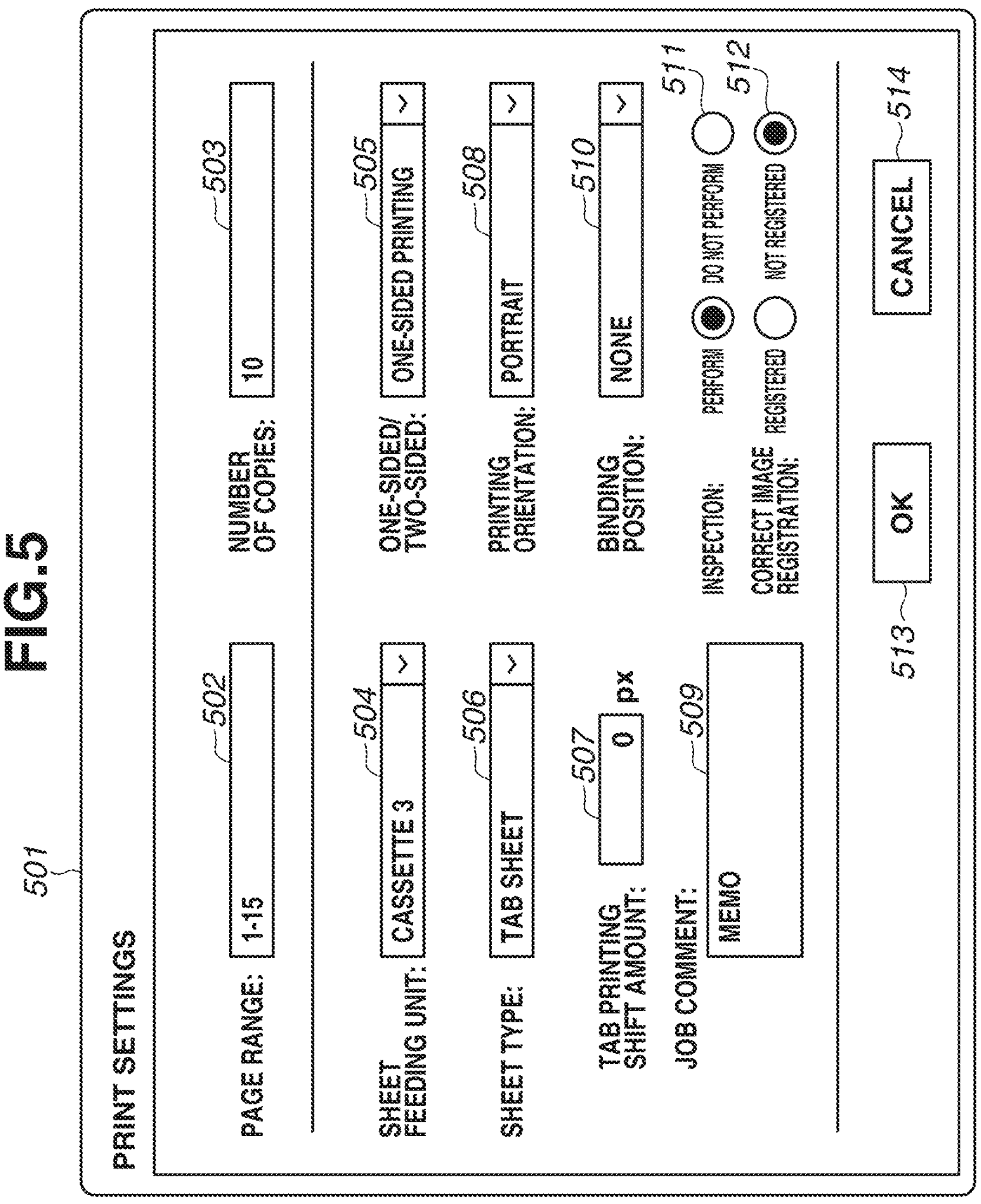
FIG. 5 illustrates an example of a display screen for inputting an inspection job to an inspection apparatus.

FIG. 5 illustrates an example of a job setting screen displayed on the display 212 of the external controller 102 when the inspection is performed and when a correct image is registered. This print setting screen may be regarded as an example of a screen of a printer driver applicable to the image forming apparatus 101 installed in the PC 103. The user who wants to perform printing can open this screen from various applications and issue a print instruction.

A print setting screen 501 includes a page range text box 502 for specifying a page range, and allows the user to make print settings for sheets of the page range specified with the text box 502. Examples of print settings include the number of copies, sheet feeding unit, one-sided/two-sided printing, sheet type, printing orientation, job comment, and binding position. A Number of Copies text box 503 is used to specify the number of copies of the page range specified with the Page Range text box 502. A Sheet Feeding Unit pull-down menu 504 is used to select the sheet feeding unit from which to feed sheet out of a plurality of sheet feeding units 230. A One-Sided/Two-Sided pull-down menu 505 is used to select one-sided or two-sided printing. A Sheet Type pull-down menu 506 is used to select a sheet type such as a plain sheet and a thick sheet. A Tab Printing Shift Amount pull-down menu 507 is used to make printing on the tab of a tab dividers (hereinafter, referred to as tab sheet). When making printing on the tab, the user arranges a text or drawing on a document and notifies the printing apparatus 107 of a shift amount. The printing apparatus 107 generates an image at a position on the sheet shifted by the specified shift amount and performs printing.

According to the present exemplary embodiment, descriptions will be provided based on a 0-pixel setting for the tab printing shift amount. According to other exemplary embodiments, descriptions will be provided in consideration of the Tab Printing Shift Amount 507. A Printing Orientation pull-down menu 508 is used to select the printing orientation, portrait or landscape. A Job Comment text box 509 is used to input a comment about the job. A Binding Position pull-down menu 510 is used to select a binding position from upper left, upper right, lower left, and lower right. Inspection options 511 are used to specify whether to perform the inspection processing. If "Perform" is selected, the job is subjected to the inspection. If "Do Not Perform" is selected, the job is processed as a normal job. Correct image Registration options 512 indicate the status of the correct image registration to the inspection apparatus 109, and are selectable by the user. If the inspection has never been executed, "Not Registered" is preset. If an inspection job has been once executed, "Registered" is selected. The Correct image Registration options 512 are used to memorize whether an inspection job has been executed in the print setting screen in FIG. 5. When the screen in FIG. 5 is opened, the Correct image Registration options 512 may be provided with the option selected ("Registered" may be automatically selected). If the user wants to explicitly register a correct image again even for the same job for which the inspection processing has been performed in the past, the user may select "Not Registered". In other words, even when "Registered" is selected for the options 512, the user is able to register a correct image again by selecting "Not Registered" and pressing an OK button 513. In response to the user pressing the OK button 513, the printing apparatus 107 completes the print settings and performs print processing based on the print settings in FIG. 5. In response to the user pressing a Cancel button 514, the printing apparatus 107 cancels the print settings and execution and ends the processing. The sheet type and sheet size to be used at the time of printing are storable for a correct image. For example, the sheet type and sheet size of a tab sheet are storable.

Figure 6:
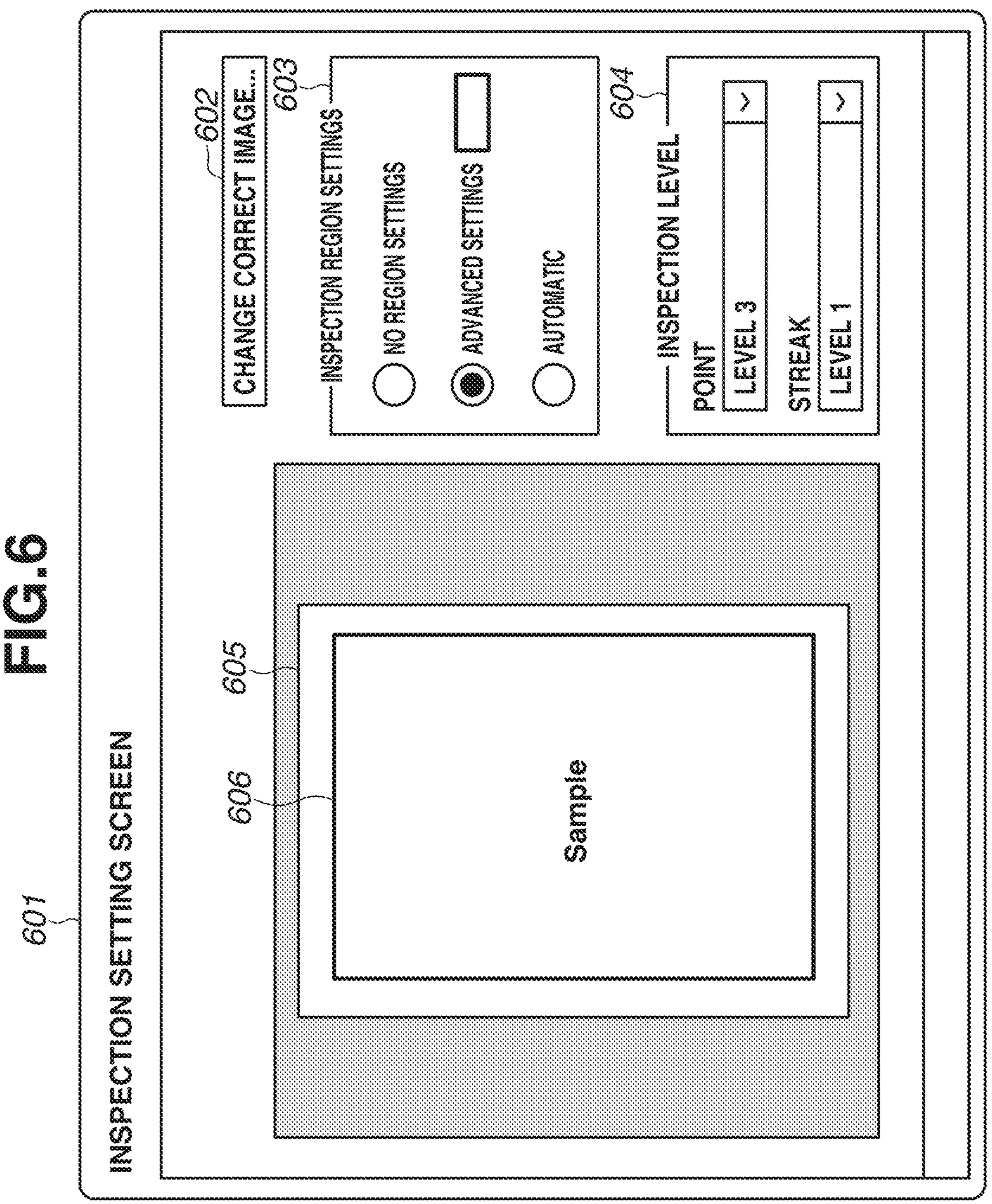
FIG. 6 illustrates an example of a screen displaying inspection settings for a correct image on the inspection apparatus.

FIG. 6 illustrates an example of an inspection setting screen for a correct image which is settable on the inspection apparatus 109, displayed on the display unit 241 of the inspection apparatus 109. This inspection setting screen may be displayable not only on the display unit 241 of the inspection apparatus 109 but also on the display 212 of the external controller 102. A user who wants to perform the inspection is able to make advanced inspection settings for a correct image in the inspection setting screen. For example, after the user selects a correct image stored in the inspection apparatus 109 on the display unit 241 of the inspection apparatus 109, the screen in FIG. 6 appears.

In an inspection setting screen 601, the correct image to be compared for inspection at the time when the inspection is performed is changeable with a Change Correct image button 602. In the screen 601, a correct image to be compared for the inspection has been selected. For an Inspection Region Settings block 603, one of three different options "No Region Settings", "Advanced Settings", and "Automatic" is selectable. If "No Region Settings" is set, the inspection apparatus 109 does not compare a specific region in the correct image with a specific region in the scan image read after printing but compares the entire range of the correct image with the entire range of the scan image read after printing, at the time of the inspection. If "Advanced Settings" is set, a specific region, in the correct image 605, to be compared for the inspection is represented by the rectangle of a detailed region 606, and the inspection apparatus 109 compares the detailed region 606 in the correct image with the detailed region 606 in the scan image read after printing, at the time of the inspection. More specifically, with "Advanced Settings" selected, the region in the frame of the detailed region 606 is targeted for the inspection but the region outside the frame of the detailed region 606 is not targeted for the inspection. The user can enlarge or reduce the rectangle 606 by operating the frame of the rectangle 606 with the mouse. The user can also change the shape of the rectangle 606 to a quadrangle other than a rectangle. The rectangle 606 is changeable to a quadrangle smaller than the size of a sheet 605.

If "Automatic" is set, the inspection apparatus 109 compares the correct image as a reference image with a specific region of the scan image read after printing. For example, when the correct image of the A4 size is printed on tab sheet of the A4 size, the size with the width of the tab added to the A4 size is set to the size of the correct image, for the scan image of the tab sheet. With "Automatic" selected, the A4 size portion of the correct image is set to an inspection region. More specifically, only the portion surrounded by the A4 size out of the scan image of the tab sheet is targeted for the inspection. An example of an inspection in accordance with the inspection region settings will be described below with reference to FIGS. 10A to 10C.

Figure 7:
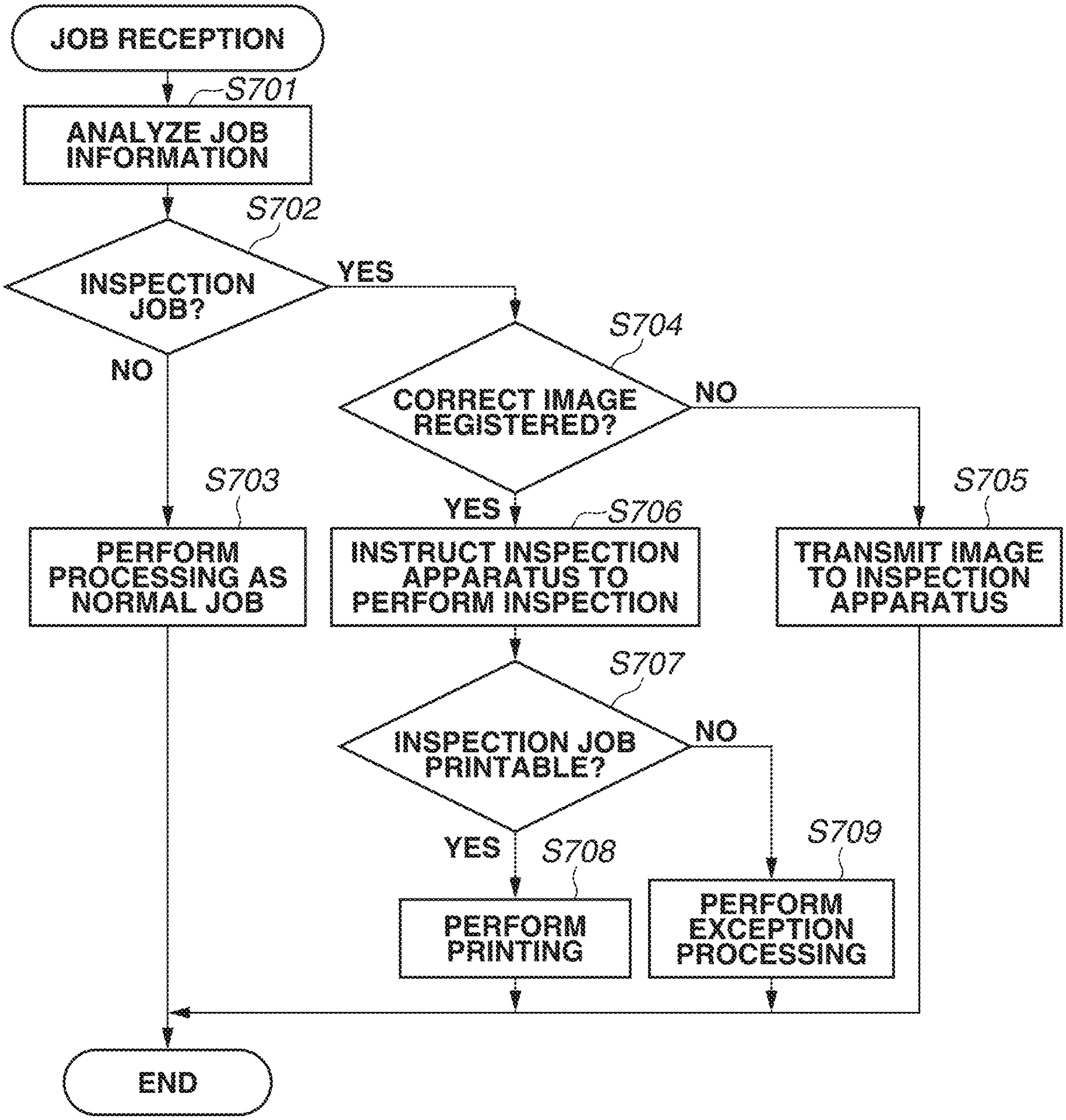
FIG. 7 is an example of a flowchart illustrating correct image registration and printing performed by a printing apparatus in response to receiving a job.

FIG. 7 is a flowchart illustrating the inspection processing and the correct image registration performed by the printing apparatus 107 after the job set in the print setting screen in FIG. 5 is received. The processing in FIG. 7 is executed by the CPU 222 of the printing apparatus 107. The processing in FIG. 7 will be described below with reference to the software configuration in FIG. 4. When the user presses the OK button 513 in FIG. 5 on the external controller 102, the job is transmitted from the external controller 102 to the printing apparatus 107. When "Perform" is selected for the Inspection options 511 in FIG. 5, the inspection job is issued. Different flags indicating the registration status are set in the job attribute depending on whether "Registered" or "Not Registered" is selected.

When "Do Not Perform" is selected for the Inspection options 511, a normal job is issued. The processing in FIG. 7 is started when the CPU 222 of the printing apparatus 107 receives a job. In step S701, the job control unit 401 analyzes job information transmitted from the external controller 102.

In step S702, the job control unit 401 determines whether the received job is an inspection job as a result of the analysis in step S701. If the job control unit 401 determines that the received job is not an inspection job (NO in step S702), the processing proceeds to step S703. In step S703, the job control unit 401 performs processing as a normal job. Here, a normal job refers to a print job, and a job not to be subjected to the inspection, such as a job for storing a document or image.

More specifically, the CPU 222 executes image formation based on a job as usual, and the printing apparatus 107 outputs a print product.

The printing apparatus 107 discharges a sheet.

If the job control unit 401 determines that the received job is an inspection job (YES in step S702), the processing proceeds to step S704. In step S704, the job control unit 401 determines whether the job attribute indicates that a correct image has been registered as a result of the analysis in step S701. If the job control unit 401 determines that the job attribute indicates that a correct image has been registered (YES in step S704), the processing proceeds to step S706. In step S706, the job control unit 401 instructs the inspection apparatus 109 to start the inspection. With the inspection start instruction, the job control unit 401 transmits information to be used for the inspection processing, such as the sheet size and sheet type, out of the job information transmitted from the external controller 102. The processing performed by the inspection apparatus 109 when an instruction in step S706 is issued will be described below with reference to FIG. 8.

If the job attribute indicates that no correct image has been registered (NO in step S704), the processing proceeds to step S705. In step S705, the job control unit 401 transmits the image that has been transmitted from the external controller 102, to the inspection apparatus 109 and registers the image as a correct image in the memory 209. In step S707, as a result that the image transmission unit 404 issues the inspection start instruction to the inspection apparatus 109 in step S706, the job control unit 401 determines whether the inspection job is printable. If the inspection job is printable (YES in step S707), the processing proceeds to step S708. In step S708, the image printing unit 405 prints all of inspection target jobs and ends the processing.

If the inspection job is not printable (NO in step S707), the processing proceeds to step S709. In step S709, the job control unit 401 performs exception processing without performing printing. Examples of cases in which the inspection job is not printable include a case where the inspection apparatus 109 has deleted the registered correct image after the inspection. Other possible cases include a case where the printing apparatus 107 and the inspection apparatus 109 cannot communicate with each other after the issuance of the inspection start instruction in step S706, and a case where inspection region settings are not properly made as illustrated in step S808 in FIG. 8.

In the exception processing, therefore, the job control unit 401 may notify the external controller 102 of an error to display an error screen and then enter the job again in accordance with a user instruction.

Alternatively, the job control unit 401 may display an error on the operation unit 224 of the printing apparatus 107 and then prompt the user to instruct whether to cause the inspection apparatus 109 to properly make the inspection settings or to cancel printing.

Alternatively, the job control unit 401 may display an error on the operation unit 242 of the inspection apparatus 109 and then prompt the user to instruct whether to cause the inspection apparatus 109 to properly make the inspection settings or to cancel printing.

Figure 8:
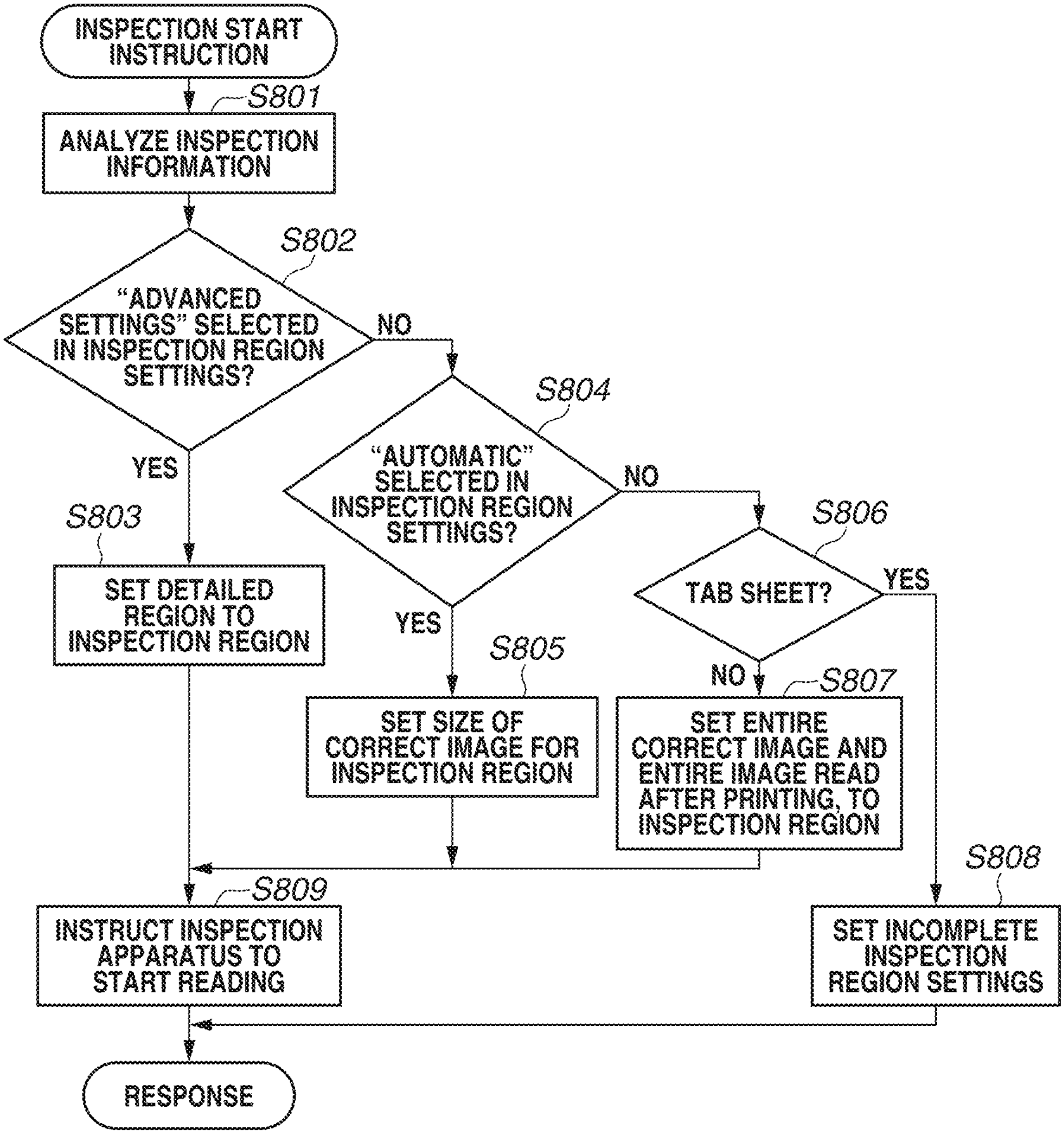
FIG. 8 is an example of a flowchart illustrating control performed by the inspection apparatus in response to receiving an inspection instruction from the printing apparatus.

FIG. 8 is a flowchart illustrating a control method performed by the inspection apparatus 109 in response to receiving the inspection start instruction in step S706 in FIG. 7.

In step S801, the CPU 238 analyzes job information transmitted from the printing apparatus 107 and inspection setting information for the correct image to be compared for inspection. The inspection setting information is preset when the user registers an inspection target image and selects the inspection target image in the inspection setting screen 601 in FIG. 6.

In step S802, the CPU 238 determines whether "Advanced Settings" is preset for the Inspection Region Settings block 603 in the inspection setting screen 601. If the CPU 238 determines that "Advanced Settings" is preset (YES in step S802), the processing proceeds to step S803. In step S803, the CPU 238 sets the detailed region to an inspection region. The detailed region refers to the region specified with the rectangle 606. If the CPU 238 determines that "Advanced Settings" is not selected (NO in step S802), the processing proceeds to step S804. In step S804, the CPU 238 determines whether "Automatic" is selected for the Inspection Region Settings block 603 in the inspection setting screen 601. If the CPU 238 determine that "Automatic" is preset (YES in step S804), the processing proceeds to step S805. In step S805, the CPU 238 sets the size of the correct image for an inspection region. If the CPU 238 determines that "Automatic" is not selected (NO in step S804), the processing proceeds to step S806. In step S806, the CPU 238 determines whether the print target sheet is a tab sheet as a result of the analysis in step S801. If the CPU 238 determines that the print target sheet is not a tab sheet (NO in step S806), the processing proceeds to step S807. In step S807, the CPU 238 sets the entire range of the correct image and the entire range of the scan image after printing to inspection regions. Here, the CPU 238 determines whether the print target sheet is a tab sheet based on whether a tab sheet is selected with the Sheet Type pull-down menu 506 in FIG. 5 on the CPU 222. If the CPU 238 determines that the print target sheet is a tab sheet (YES in step S806), the processing proceeds to step S808. In step S808, the CPU 238 sets "incomplete inspection region settings" and ends the processing. After completion of the operations in step S803, S805, or S807, then in step S809, the CPU 238 instructs the inspection apparatus 109 to start image reading.

Figure 9:
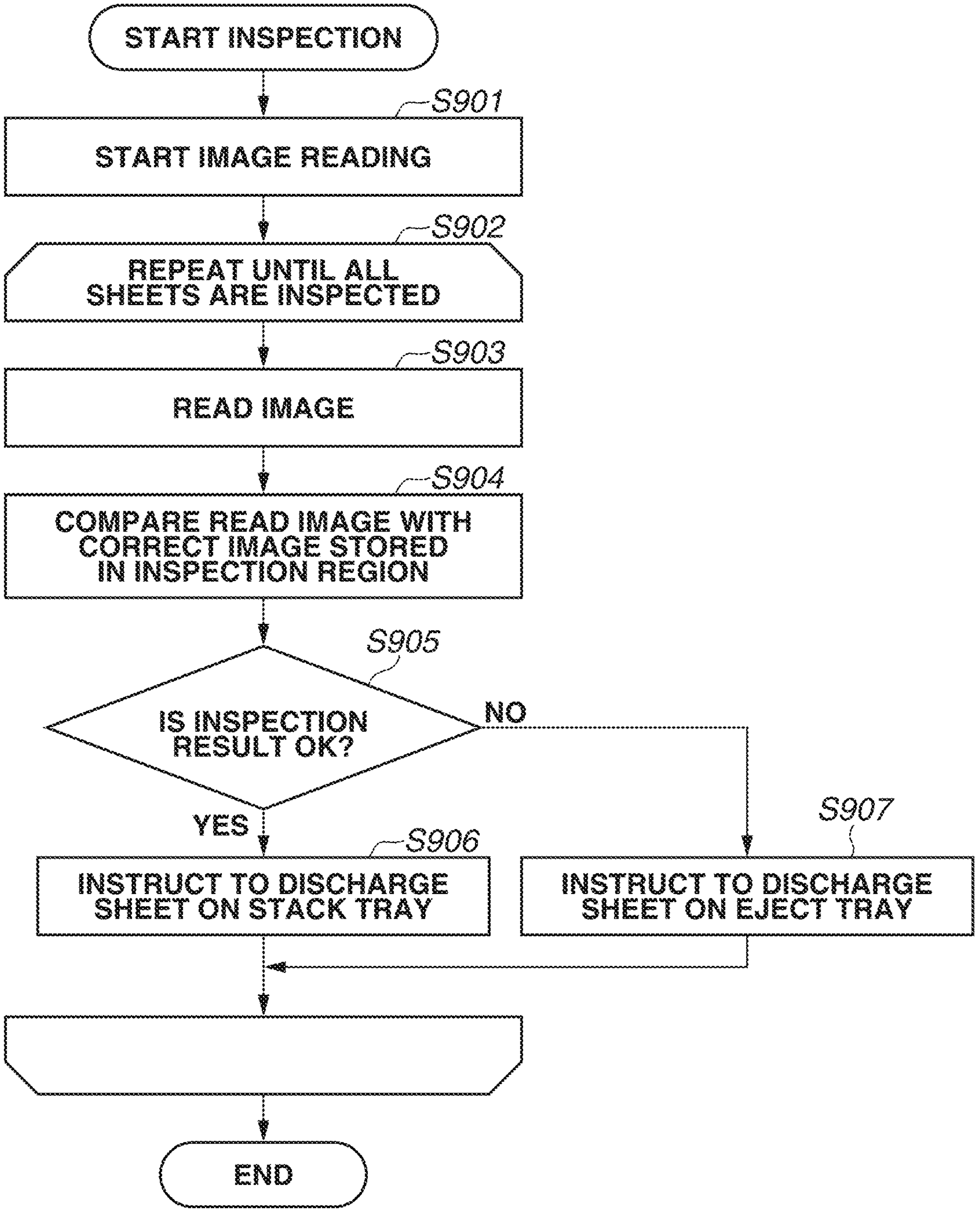
FIG. 9 is an example of a flowchart illustrating inspection processing performed by the inspection apparatus on an inspection job printed by the printing apparatus.

FIG. 9 is an operation flowchart illustrating basic operations performed by the inspection apparatus 109 at the time of the inspection.

In step S901, the CPU 238 receives the inspection start instruction in step S706 in FIG. 7 and step S809 in FIG. 8, and activates the cameras 331 and 332 to start processing for comparing the scan image with the correct image. In step S902, if an inspection target sheet remains, the processing proceeds to step S903. In step S903, the CPU 238 reads an image on the sheet by using the cameras 331 and 332. In step S904, the CPU 238 compares the correct image prestored in the memory 239 with the image read in step S903.

The inspection apparatus 109 receives the correct image transmitted in step S705 in FIG. 7.

In the present exemplary embodiment, the correct image is preregistered and prestored in the memory 239 by the inspection apparatus 109.

In the comparison operation, the CPU 238 initially aligns the positions of the correct image and the inspection target scan image by using feature points of the image as reference points for positioning. Then, for the inspection target scan image, the CPU 238 analyzes the four corners of the sheet and the alignment reference points of the scan image to determine whether an image positional shift is present. Subsequently, the CPU 238 compares the density values of the correct image and the inspection target scan image on a pixel by pixel basis. If no defect is detected as a result of the comparison, the CPU 238 determines that the inspection result is OK. If the inspection result indicates OK (YES in step S905), the processing proceeds to step S906. In step S906, the CPU 238 instructs the large-capacity stacker 110 to discharge the sheet, for example, to the stack tray 341.

If the inspection result is unacceptable (NO in step S905), the processing proceeds to step S907. In step S907, the CPU 238 instructs the large-capacity stacker 110 to discharge the sheet, for example, to the escape tray 346.

The CPU 238 repeats steps S902 to S907 until the inspection is completed for all of inspection target sheets. When the inspection is completed for all of inspection target sheets, the processing of this flowchart is ended.

In the above-described example, a sheet is discharged to the stack tray 341 if the inspection result is OK or discharged to the escape tray 346 if the inspection result is unacceptable. However, the discharge destination may be changed in accordance with a user instruction or the print settings, and the discharge form is not limit thereto.

Figure 10A:
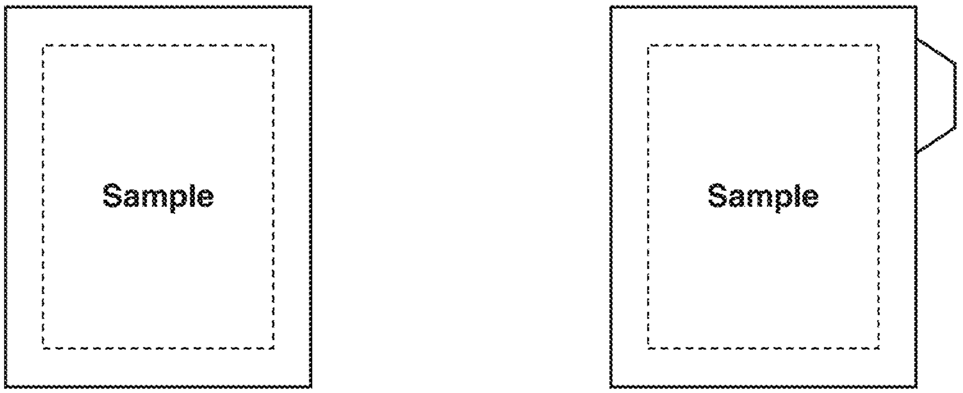
FIGS. 10A to 10C illustrate examples for inspection region comparison for correct images and scan images for different inspection region settings.
Figure 10B:
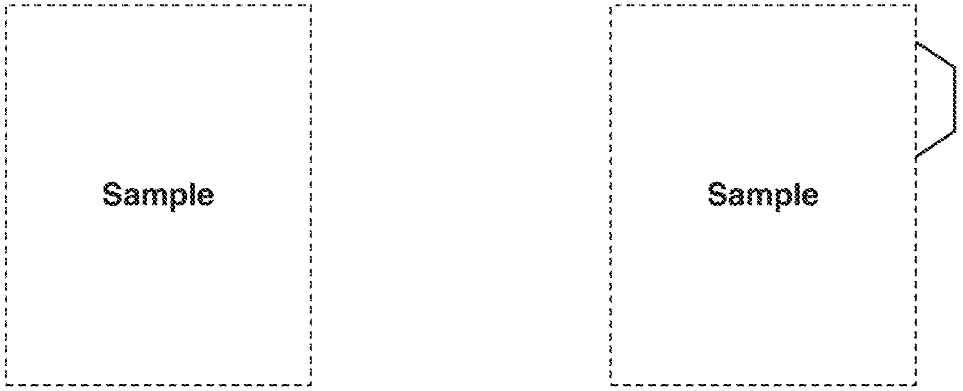
Figure 10C:
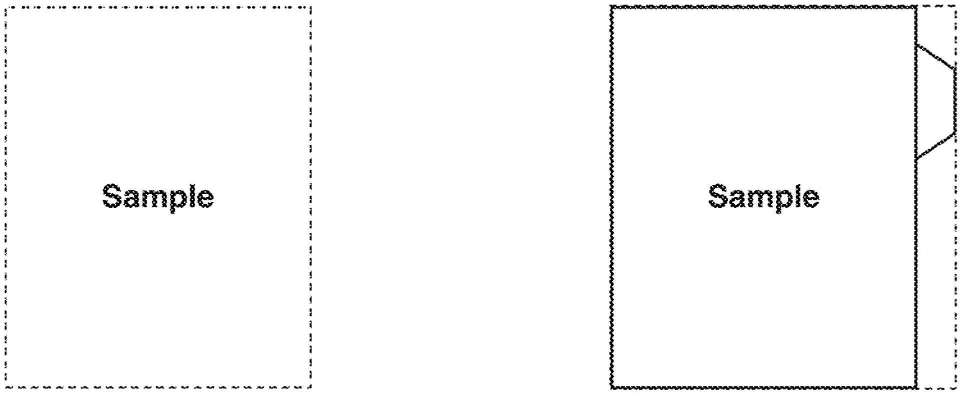

FIGS. 10A to 10C illustrate comparative examples of the correct image and the scan image read after printing based on the inspection region settings for the Inspection Region Settings block 603 in the inspection setting screen 601 in FIG. 6. In each example, the correct image, arranged left, and the scan image of tab paper, arranged right, are of the A4 size. Comparison target regions are indicated with dotted lines. In a comparative example 1001 with detailed settings in FIG. 10A, "Advanced Settings" is selected for the Inspection Region Settings block 603 in the inspection setting screen 601, and a detailed region is determined by the user. While the scan image has a tab in this case, it is possible to normally perform a comparison because a square inspection region is specified. In a comparative example 1002 with automatic setting in FIG. 10B, "Automatic" is selected for the Inspection Region Settings block 603 in the inspection setting screen 601, and the size of the correct image is used as an inspection region. In this case, the scan image has a tab, and the size of dotted lines is the A4 size for both the correct image and the scan image. If the tab is not to be subjected to the inspection, it is possible to normally perform a comparison. For a comparative example 1003 with no settings in FIG. 10C, "No Region Settings" is selected for the Inspection Region Settings block 603 in the inspection setting screen 601, and the entire region of the correct image and the entire region of the scan image are set to an inspection region. In this case, since the correct image and the tab are of the A4 size, the scan region includes the width including the tab region. In other words, if the inspection is performed in this state, an inspection result will be unacceptable, so that the CPU 238 sets "incomplete inspection region settings" and executes the exception processing in steps S707 and S709 in FIG. 7 and steps S806 and S808 in FIG. 8.

As described above, if "Advanced Settings" is selected for the Inspection Region Settings block 603 in the inspection setting screen 601 in FIG. 6, it is possible to perform the inspection processing while preventing an unacceptable inspection result and eliminating a need of skipping the inspection, even if an inspection target sheet has a special shape, such as a tab sheet. More specifically, for example, to inspect a tab sheet, a desired region is surrounded in the detailed region 606 in the inspection setting screen 601 in FIG. 6 with the tab excluded as illustrated in FIG. 10A. This sets the surrounded region to the inspection target region and sets the region (including the tab) not surrounded by the detailed region 606 to be out of the inspection target region.

Other exemplary embodiments will be described below. According to the above-described first exemplary embodiment, in a case where the inspection target print sheet is a tab sheet and printing on the tab is not to be performed, appropriately setting an inspection region enables performing the inspection processing while preventing an unacceptable inspection result and eliminating a need of skipping the inspection. Other exemplary embodiments will be described below centering on the inspection processing in a case where printing has been performed on the tab of a tab sheet.

Figure 11A:
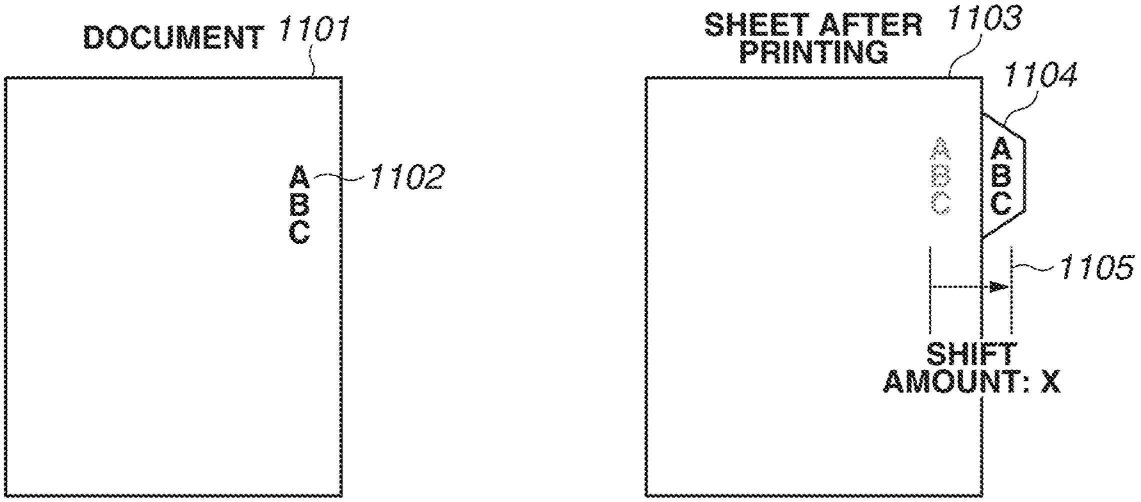
FIGS. 11A and 11B illustrate an example of printing made on a tab and an example of inspection.
Figure 11B:
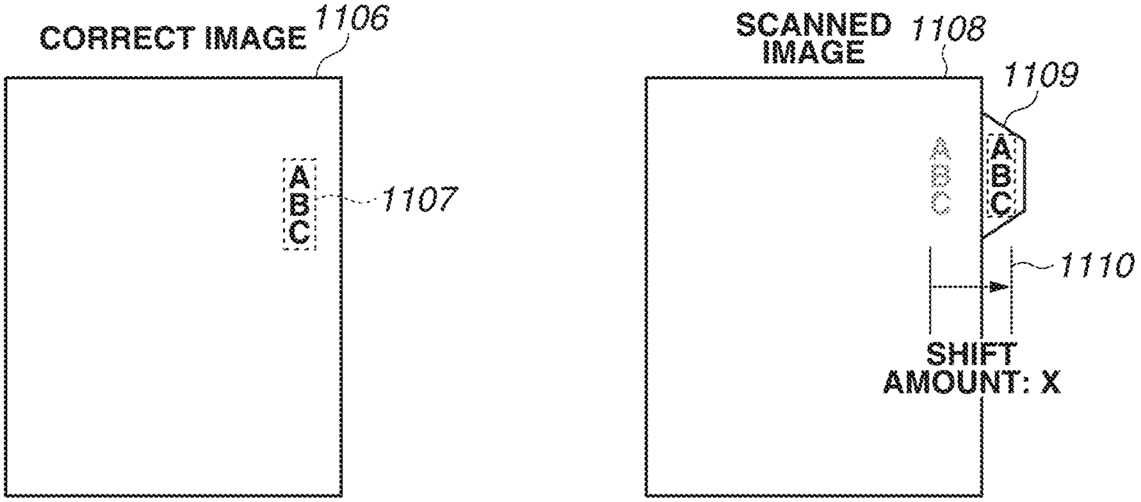

FIG. 11A illustrates an example of printing performed on the tab, and FIG. 11B illustrates an example of an inspection after printing is performed on the tab, in a case where the Tab Printing Shift Amount 507 is set in the print setting screen 501.

The example of printing performed on the tab in FIG. 11A will be described below. A document 1101 is of the A4 size, and contents 1102 to be printed on the tab is recorded in the document 1101. In this case, the printing target sheet for the document 1101 is a tab sheet, but the document 1101 includes no portion corresponding to the tab of the tab sheet, the contents 1102 to be printed is arranged in the A4 size of the document 1101. A printed sheet 1103 indicates a state where the document 1101 is printed on the tab sheet. The contents 1102 of the document 1101 is printed on a tab 1104. In this case, the printing apparatus 107 performs printing on the tab of the tab sheet with the print position shifted by a shift amount 1105 that is the amount specified for the Tab Printing Shift Amount 507.

Information such as the Tab Printing Shift Amount 507 is obtainable by analyzing the job information in step S701 in FIG. 7 and is printable.

An example of an inspection on the tab in FIG. 11B will be described below. In FIG. 11B, it is indicated that a correct image 1106 is image data equivalent to the document 1101, "Advanced Settings" has been selected for the Inspection Region Settings block 603, and an inspection region 1107 has been set for the correct image 1106. A scan image 1108 represents an image generated by scanning the printed sheet 1103. Of the scan image 1108, an inspection region 1109 is to be subjected to the inspection. The inspection region 1109 is positioned by shifting the inspection region 1107 of the correct image 1106 by a shift amount 1110. The shift amount 1110 may be a value equivalent to the shift amount 1105 specified at the time of printing. The tab can be subjected to the inspection by reflecting the shift amount 1105.

As illustrated in these examples, selecting "Advanced Settings" for the Inspection Region Settings block 603 enables the inspection on the tab. With "No Region Settings" or "Automatic" selected, the inspection cannot be properly performed.

Figure 12:
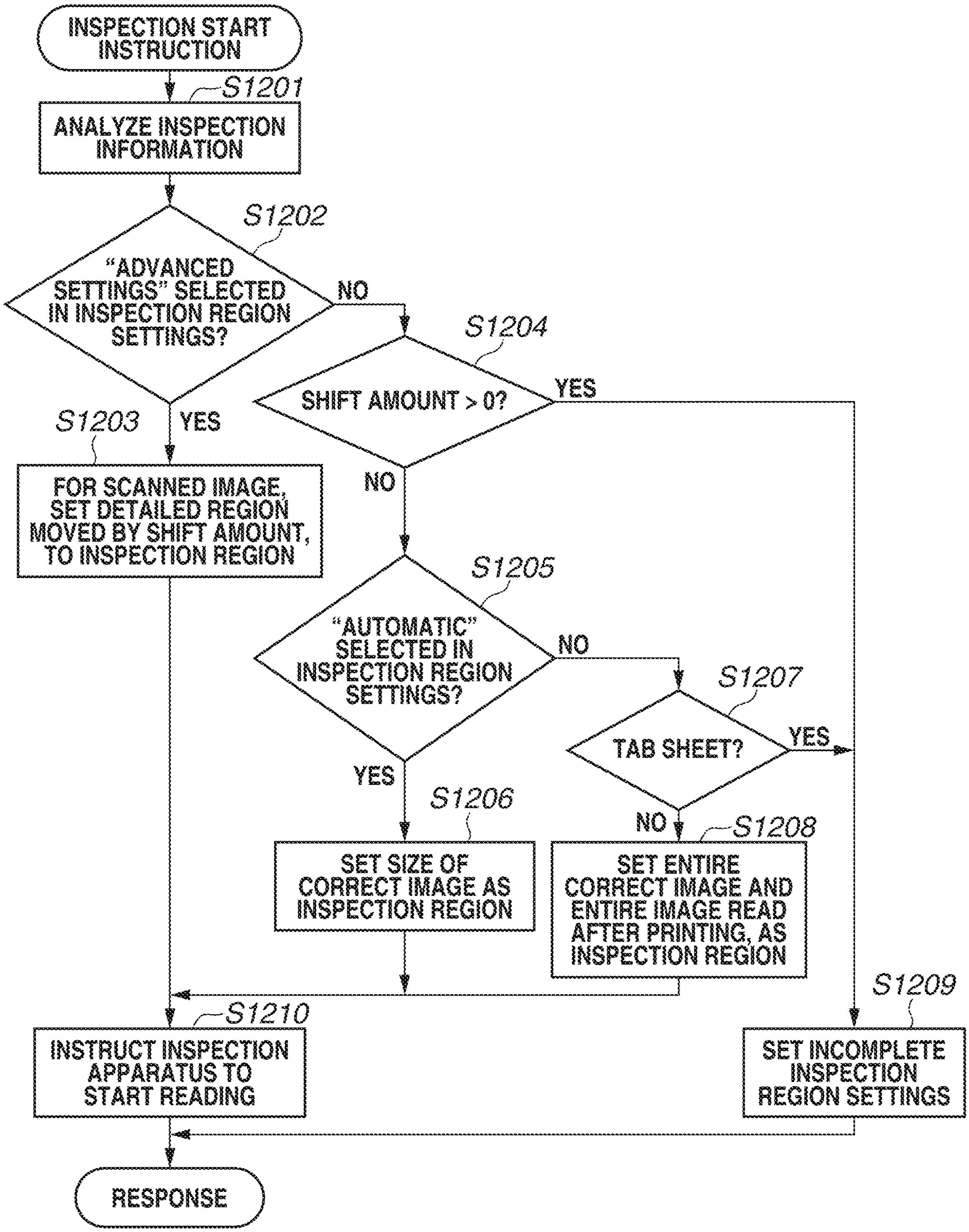
FIG. 12 is an example of a flowchart illustrating control according to another exemplary embodiment performed by the inspection apparatus in response to receiving an inspection instruction from the printing apparatus.

FIG. 12 is a flowchart illustrating a method for controlling the inspection apparatus 109 when the correct image is transmitted to the inspection apparatus 109 in step S706 in FIG. 7 in a case where the Tab Printing Shift Amount 507 as indicated in FIGS. 11A and 11B has been set. This flowchart will be described below centering on differences from the flowchart in FIG. 8.

In step S1201, the CPU 238 analyzes the job information transmitted from the printing apparatus 107 and the inspection setting information for the correct image to be compared for the inspection (the inspection setting screen 601 in FIG. 6).

In step S1202, the CPU 238 determines whether "Advanced Settings" is selected for the Inspection Region Settings block 603 in the inspection setting screen 601. If the CPU 238 determines that "Advanced Settings" is set (YES in step S1202), the processing proceeds to step S1203. In step S1203, the CPU 238 sets a detailed region to an inspection region. In step S1203, the CPU 238 sets the detailed inspection region of the correct image and also sets, to an inspection target region, the detailed region with the amount specified for the Tab Printing Shift Amount 507 in FIG. 5 shifted, for the scan image generated by scanning the printed sheet. In a case where the detailed inspection region has been set, the tab printing shift amount may be reflected without caring because the shift amount is zero if not set. If the CPU 238 determines that "Advanced Settings" is not selected (NO in step S1202), the processing proceeds to step S1204. In step S1204, the CPU 238 determines whether the tab printing shift amount is larger than zero. If the CPU 238 determines that the tab printing shift amount is larger than zero (YES in step S1204), the processing proceeds to step S1209. In step S1209, the CPU 238 sets "incomplete inspection region settings" and ends the processing. This specifically means that, in a case where the tab printing shift amount is larger than zero, the inspection is not feasible only in a case where "Advanced Settings" is selected. If the CPU 238 determines that the tab printing shift amount is not larger than zero (NO in step S1204), the processing proceeds to step S1205. In step S1205, the CPU 238 determines whether "Automatic" is selected for the Inspection Region Settings block 603 in the inspection setting screen 601. If the CPU 238 determines that "Automatic" is selected (YES in step S1205), the processing proceeds to step S1206. In step S1206, the CPU 238 sets the size of the correct image to an inspection region. If the CPU 238 determines that "Automatic" is not selected (NO in step S1205), the processing proceeds to step S1207. In step S1207, the CPU 238 determines whether the printing target sheet is a tab sheet as a result of the analysis in step S1201. If the CPU 238 determines that the printing target sheet is not a tab sheet (NO in step S1207), the processing proceeds to step S1208. In step S1208, the CPU 238 sets the entire range of the correct image and the entire range of the scan image after printing to inspection regions. If the CPU 238 determines that the printing target sheet is a tab sheet (YES in step S1207), the processing proceeds to step S1209. In step S1209, the CPU 238 sets "incomplete inspection region settings" and ends the processing. After completion of step S1203, S1206, or S1208, then in step S1210, the CPU 238 instructs the inspection apparatus 109 to start image reading.

As described above, even if the user wants to inspect the tab of the tab paper, "Advanced Settings" for the Inspection Region Settings block 603 in the inspection setting screen 601 is to be set. This enables execution of the inspection processing while preventing an unacceptable inspection result and eliminating the need of skipping the inspection, even if the inspection target sheet has a special shape, such as a tab sheet.

The present exemplary embodiment has been described above based on the following. FIG. 2 is an example of an inspection system. Although the inspection apparatus 109, the PC 103, and the external controller 102 may be implemented in different housings as illustrated in FIG. 2, these elements may be partly or entirely integrated.

Initially, an example of a user interface in FIG. 6 has been described above. This interface allows the user to set an inspection region in a sheet having a different shape from the sheet set for the correct image.

The camera 331 has been described above as an example of a reading unit that reads a sheet having a different shape from the sheet set for the correct image. As a result of reading, a scan image as illustrated in FIGS. 10A to 10C is obtained.

The inspection apparatus 109 performs the following processing based on the inspection region 606 set in "Advanced Settings" for the Inspection Region Settings block 603 in FIG. 6, the correct image prestored in the inspection apparatus 109, and the image obtained as a result of reading by the camera 331. More specifically, the inspection apparatus 109 performs the inspection processing on the image output to a sheet having a different shape from the sheet set for the correct image. The inspection processing refers to, for example, processing in which the CPU 238 compares a specified inspection target region in the correct image with a specified inspection target region in the scan image, and determines that a result of the inspection is unacceptable if a difference is present, and determines a result of the inspection is OK if no difference is present.

The camera 331 is able to read a tab sheet having been subjected to the print processing, to obtain an image.

The user interface in FIG. 6 allows the user to set a region in the tab sheet.

In the tab sheet, a region other than at least a tab of the tab sheet, corresponding to the region in the correct image is set to be included.

The CPU 238 executes the inspection processing with the correct image for the region set with the user interface in FIG. 6. The CPU 238 may not execute the inspection processing for regions not set with the user interface.

The CPU 238 executes the following processing based on the inspection region other than the tab set in the user interface in FIG. 6, the prestored correct image, and the scan image obtained as a result of reading by the camera 331. The CPU 238 executes, for example, the inspection processing on the image output to a sheet having a different shape from the sheet set for the correct image.

According to an aspect of the present exemplary embodiment of the present disclosure, there is provided a mechanism for performing the inspection even for a print medium having a different shape from the print medium set for the inspection comparison target image. According to another aspect of the present exemplary embodiment of the present disclosure, there is provided a mechanism for performing the inspection reflecting user demands.

OTHER EMBODIMENTS

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2022-134631, filed Aug. 26, 2022, which is hereby incorporated by reference herein in its entirety.

What is claimed is:

1. An inspection system comprising:

at least one memory storing instructions; and at least one processor executing the instructions causing the inspection system to function as:

a setting unit configured to set, for a reference image, an inspection setting including at least information on an inspection target;

a reading unit configured to read a sheet having a different shape from a sheet set for the reference image, thereby generating a read image; and an execution unit configured to execute inspection processing on the read image of the sheet having the different shape, based on the inspection setting and the reference image, wherein the execution unit is further configured to dynamically generate an inspection region by comparing sheet shapes set in the reference image and sheet shapes set in the read image such that only the common region is selected for inspection and the non-common region is automatically excluded, and wherein, in the inspection processing, at least a part of a common region that is common to a region of the sheet having the different shape and a region of the sheet set for the reference image is inspected as the inspection target, a non-common region that is not common to the region of the sheet having the different shape and the region of the sheet set for the reference image is excluded from the inspection target, wherein the sheet having the different shape is a tab sheet, wherein the non-common region is a tab region of the tab sheet, wherein, in the inspection processing, wherein the common region not including the tab region is inspected as the inspection target, and the tab region is excluded from the inspection target, the inspection system further comprising:

a job control unit capable of setting whether or not to set an inspection setting of setting the common region that is common to the region of the sheet having the different shape and the region of the sheet set for the reference image as the inspection target and not setting the tab region as the inspection target, wherein, in a case where it is set to inspect the tab region and in addition where an object placed in the tab region is to be inspected, the job control unit places the object on the reference image and shifts the object such that a position of the object placed on the reference image and a position of the object placed in the tab region overlap with each other in the inspection processing.

2. The inspection system according to claim 1, the common region corresponds to an entirety of the region of the sheet set for the reference image and corresponds to a part of the region of the sheet having the different shape.

3. The inspection system according to claim 1, wherein the sheet having the different shape is a sheet including the region of the sheet set for the reference image and an additional region added thereto, and wherein the common region corresponds to an entirety of the region of the sheet set for the reference image and corresponds to an entirety of the region of the sheet having the different shape with the additional region excluded.

4. The inspection system according to claim 1, wherein the sheet having the different shape is a sheet including a region having a same size as the region of the sheet set for the reference image and an additional region added thereto, and wherein the common region corresponds to a part of the region of the sheet set for the reference image and does not correspond to another region, and wherein the common region does not correspond to a region corresponding to the part of the region having the same size with the additional region of the region of the sheet having the different shape and the another region with the region having the same size excluded.

5. The inspection system according to claim 1, wherein the reading unit reads a sheet having a same shape as a sheet set for the reference image, thereby generating a different read image, and wherein, based on the reference image and the inspection setting, when inspection processing of the different read image is executed, the execution unit inspects, as the inspection target, at least a part of a common region that is common to a region of the sheet having the same shape and a region of the sheet set for the reference image.

6. The inspection system according to claim 1, wherein, when a region designation of designating the inspection target is received from a user, the setting unit sets, of the common region, for the reference image, the designated inspection region as the inspection target.

7. The inspection system according to claim 1, wherein, when a region designation of designating the inspection target is received from a user, the setting unit sets, of the common region and the non-common region, a region included in the inspection region as the inspection target, and does not set a region not included in the inspection region as the inspection target.

8. The inspection system according to claim 1, further comprising a display unit configured to set a first inspection setting for receiving selection of a region for inspection from a user, a second setting for not selecting a region for inspection, and a third setting for automatically selecting a region for inspection.

9. A method for controlling an inspection system, the method comprising:

setting an inspection setting including at least information on an inspection target for a reference image;

reading a sheet having a different shape from a sheet set for the reference image, thereby generating a read image; and executing inspection processing on the read image of the sheet having the different shape, based on the inspection setting and the reference image, wherein the executing is further configured to dynamically generate an inspection region by comparing sheet shapes set in the reference image and sheet shapes set in the read image such that only the common region is selected for inspection and the non-common region is automatically excluded, and wherein, in the inspection processing, a non-common region that is not common to the region of the sheet having the different shape and the region of the sheet set for the reference image is excluded from the inspection target, wherein the sheet having the different shape is a tab sheet, wherein the non-common region is a tab region of the tab sheet, wherein, in the inspection processing, wherein the common region not including the tab region is inspected as the inspection target, and the tab region is excluded from the inspection target, the inspection system further comprising:

a job control unit capable of setting whether or not to set an inspection setting of setting the common region that is common to the region of the sheet having the different shape and the region of the sheet set for the reference image as the inspection target and not setting the tab region as the inspection target, wherein, in a case where it is set to inspect the tab region and in addition where an object placed in the tab region is to be inspected, the job control unit places the object on the reference image and shifts the object such that a position of the object placed on the reference image and a position of the object placed in the tab region overlap with each other in the inspection processing.

10. The method for controlling an inspection system according to claim 9, wherein the sheet having the different shape is a tab sheet, wherein the non-common region is a tab region of the tab sheet, wherein, in the inspection processing, the common region not including the tab region is inspected as the inspection target, and the tab region is excluded from the inspection target.

* * * * *